Jan. 9, 1945.   H. J. SMITH ET AL   2,366,939
POSITION DETERMINING MEANS
Filed April 4, 1939   7 Sheets-Sheet 1

H. J. Smith AND INVENTORS
P. Wm. Zingaro
BY
James M. Clark
ATTORNEY.

Jan. 9, 1945. H. J. SMITH ET AL 2,366,939
POSITION DETERMINING MEANS
Filed April 4, 1939 7 Sheets-Sheet 3

H. J. Smith
P. Wm. Zingaro INVENTORS.
BY James M. Clark
ATTORNEY.

Jan. 9, 1945.  H. J. SMITH ET AL  2,366,939
POSITION DETERMINING MEANS
Filed April 4, 1939  7 Sheets-Sheet 7

H. J. Smith
AND P. Wm. Zingaro.  INVENTORS.
BY
ATTORNEY.

Patented Jan. 9, 1945

2,366,939

UNITED STATES PATENT OFFICE 2,366,939

POSITION DETERMINING MEANS

Harry J. Smith and Placido William Zingaro, New York, N. Y.

Application April 4, 1939, Serial No. 265,984
In Great Britain April 5, 1937

7 Claims. (Cl. 177—352)

The present invention relates to a method and apparatus for guiding a moving object in directions determinable from identifiable points or locations. It broadly contemplates the directing of land vehicles, marine vessels or aircraft, and more particularly an adaptation for the blind landing and guiding of airplanes.

As applied to aircraft this invention consists in the creation of a beam of radiant energy of definite directional and cross-sectional characteristics projected from a given source; the provision of one or more sensitive receptors preferably spatially positioned on the airplane or other moving object; and means to indicate the sensitization of each receptor by exposure to the activity of the beam whereby the attitude, direction or position of the airplane with respect to the beam, or portions of the beam, is determined and the automatic or manual flight controls correspondingly adjusted or maintained. There is also contemplated the production of beams of novel shapes and cross-sectional patterns; and transmitting, receiving and distributing equipment whereby certain applications of the invention are more particularly carried out.

The invention also contemplates the provision of banks of suitable receptors, such as spaced photo-electric cells, coils, thermocouples or the like, exposed at the leading portions of the aircraft for energization from ahead, at the lower surfaces for reception from below or at other points. These multiple receptors are arranged such that the impulses received by each are separately amplified by a common amplifier, and their respective indicating lamps lighted from a common source, provision being made for holding the lamps in the lighted condition for a predetermined interval in excess of the period of amplification. Novel indicating instruments are provided for automatically indicating the attitude, safe altitude, position and ground speed of the moving aircraft and its relationship to the axis or core of the beam. Provision is also made for the interconnection of the receiving equipment with known automatic gyro- or robot pilot devices for the flying and landing of airplanes without manual control.

It is accordingly an object of the present invention to provide for the guiding of moving objects by the detection of beams of radiant energy which are highly directional and sharply defined over a relatively great distance, which are not absorbed or diffused by atmospheric conditions such as fog, dust and so forth. It is an object to provide receptors remotely spaced and positioned on the moving object such that when they are energized, apparatus is adapted to automatically indicate the relative intensity of the respective beam portions energizing such receptors. It is another object to provide both fixed receptors faired into the aircraft skin to eliminate drag and also streamlined receptors extensible into the airstream at the control of the operator or pilot.

It is a further object of the invention to provide receiving and indicating apparatus of relatively little weight wherein a single amplifier and lighting source will suffice for a plurality of receptors. It also contemplates a novel circuit and mechanism to separate and successively transmit the impulses from each simultaneously sensitized receptor to a common amplifier and means to receive, indicate and hold the successively amplified impulses for a given period to effect the operation of the control corresponding to the individual receptor, or to automatically operate a robot pilot device or other servo control.

While the present description of the invention has been confined principally to adaptations in connection with aircraft, it is to be understood that it is by no means limited thereto and may be utilized for the guiding of any moving object to which it is adaptable. Furthermore, in any particular adaptation, various modifications will be obvious to those skilled in the art and such are intended to be within the scope and spirit of the invention as shown in the drawings forming a part hereof and as hereinafter more fully described and claimed.

Referring now to the accompanying drawings.

Figure 1:
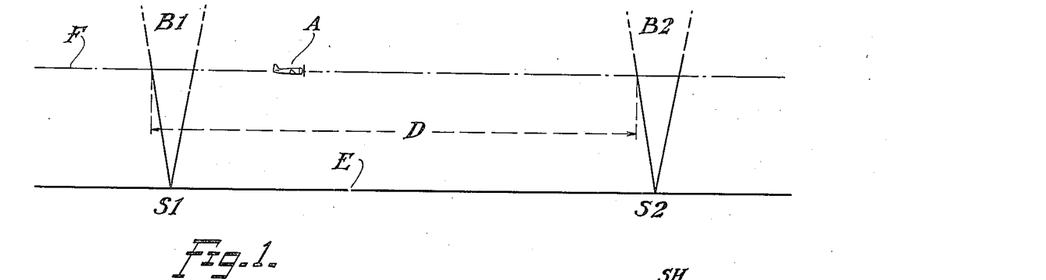
Fig. 1 shows an airplane whose flight path is intersected by two spaced vertical beams of this invention.

The sources of radiated energy beams, as indicated at S1 and S2 in Fig. 1, are provided with suitable parabolic or other reflectors or screens which cause the beams to be projected in desired directions and in predetermined beam forms or shapes. The cross-sectional area of the beam is controlled at the source, and increases as the distance from the source increases, the cross-sectional dimensions maintaining definite ratios throughout the extent of the beam.

Beam sources provided with conventional parabolic reflectors having unrestricted circular openings or lenses will project beams of conical form whose cross-sections will be circular with ever increasing diameters. In a similar manner beams of square pyramidal forms may be produced by suitably shaped reflectors, lenses and squared restrictions. The beams B1 and B2 would prefer- ably be inverted pyramids having rectangular bases, Sa, as shown in perspective in Fig. 2. In the arrangement shown in Fig. 1, hereinafter more fully described, the longest side of the rectangle Sa would preferably be disposed across, or at right angles to, the flight path F of the aircraft A.

Figures 11, 12, 13:
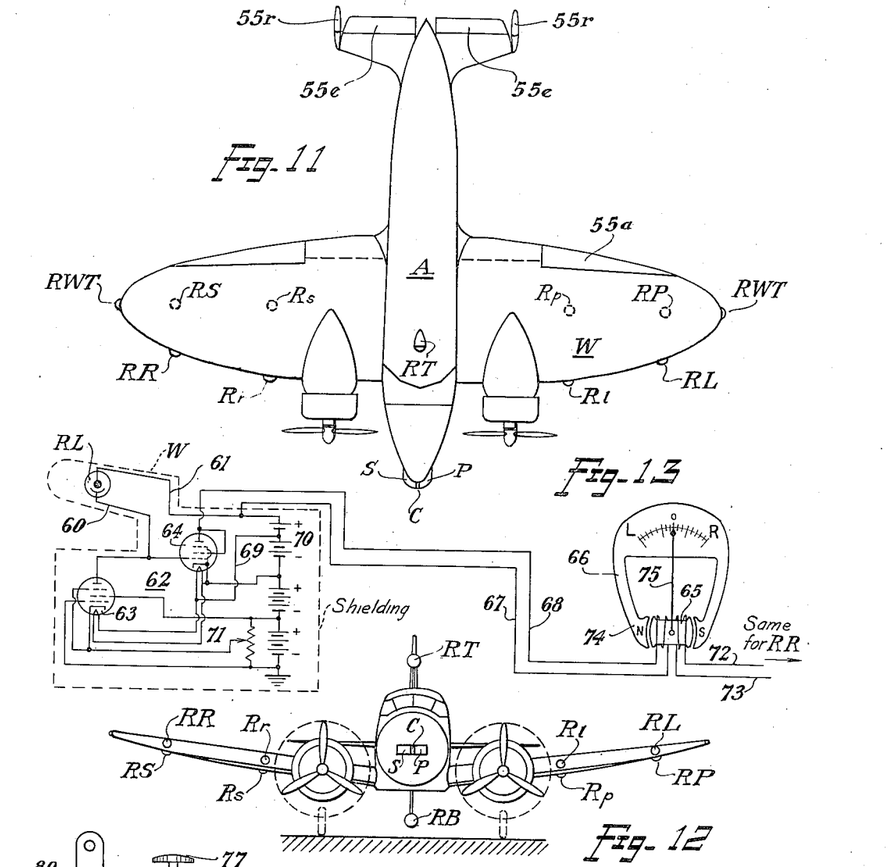
Fig. 11 shows a plan view of an airplane provided with a plurality of receptors.
Fig. 12 shows a front elevation of the same airplane.
Fig. 13 is a wiring diagram of a lateral deviation indicator.

Referring now to Figs. 11 and 12, an airplane A is provided along the leading edge of its wing W, with frontal receptors RR and Rr on its right side and receptors RL and Rl on its left side, each receptor being directed forwardly of the airplane and adapted to be energized as the airplane is flown within a beam toward its source. Similar top and bottom receptors, RT and RB respectively, are mounted on struts above and below the airplane fuselage for energization from ahead, and like receptors RS and Rs are provided at the undersurface of the wing on the right or starboard side and receptors RP and Rp on the left or port side for reception of radiated energy from below. Wing tip receptors RWT are also provided for the detection of beams which are projected at right angles to the flight path and from either side of the airplane.

Figures 2, 3, 4:
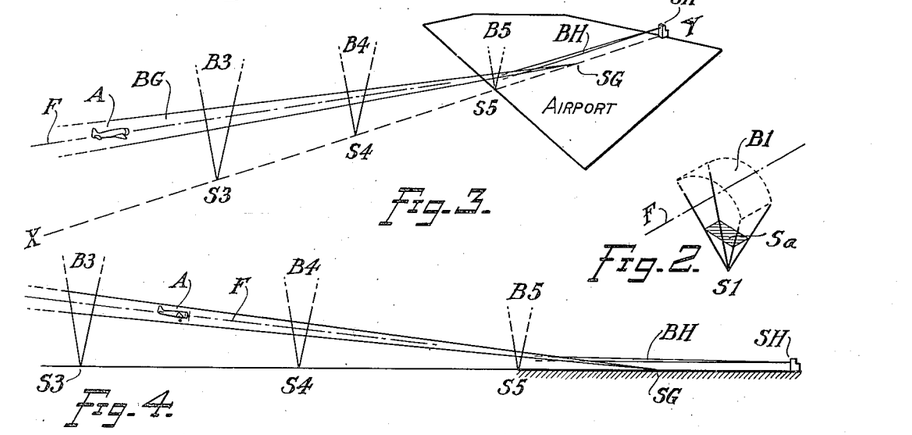
Fig. 2 shows in perspective a preferred outline of one of the vertical beams of Fig. 1.
Fig. 3 shows in perspective an aircraft landing system comprising a sloping glide beam intersected by a plurality of vertical marker beams and a horizontal ground beam directed over an airport.
Fig. 4 shows a side elevation of the landing system of Fig. 3.
Figures 14, 14A:
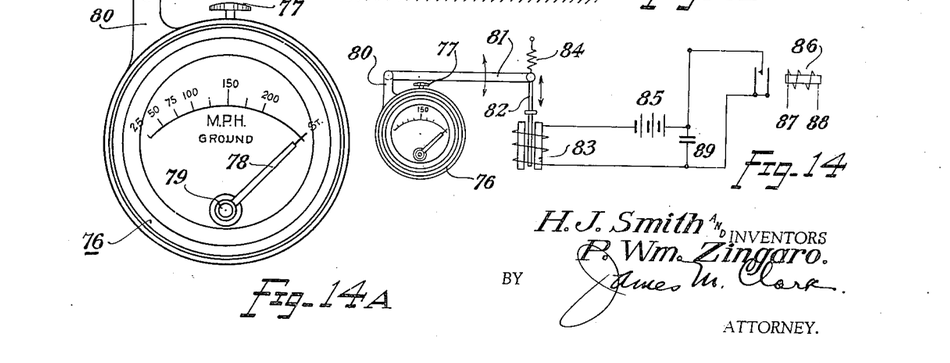
Fig. 14A shows a ground speed indicator adapted for use with the spaced vertical beams of Fig. 1.
Fig. 14 shows a wiring diagram for the same.

Fig. 1 shows an airplane A flying along its course F which is intercepted at a given distance D by the vertical beams Bf and B2, preferably of the shape shown in Fig. 2, radiated from the sources S1 and S2 spaced at predetermined distances on the terrain which sources are preferably separately modulated as by dots and dashes respectively so as to be recognizable by the pilot. The airplane is preferably provided with one or more undersurface receptors as Rs in Fig. 11 adapted to indicate the time elapsed between the entrance into the beams B1 and B2 respectively. By means of an accurate stop watch or other time measuring device, the time required for the airplane to travel the known distance D is readily convertible by the pilot to the precise ground speed of the airplane. In Figs. 14A and 14 an automatic ground speed indicator and the wiring diagram for same are shown, and will be hereinafter described.

Figs. 3 and 4 show an airport provided with a landing beam system comprising a glide beam BG sloping downwardly toward its source SG at a central portion or intersection of the landing field runways; a substantially horizontal ground beam BH projected from a mobile source SH in the same direction and vertical plane as the glide beam BG; and a plurality of vertical marker beams B3, B4 and B5. The sources of each beam in the system lie within the vertical plane represented by their intersection with the terrain at line X—Y. There should preferably be a plurality of such aligned beam sources in order that a landing direction such as X—Y can be automatically or manually selected which will coincide with an airport runway and permit the airplane A to land into the wind. In such a system the beam source SH is preferably projected from a truck or other mobile unit movable about the airport and the beam source SG is a flush type rotatable unit as shown in Fig. 27.

Figures 25, 26, 27:
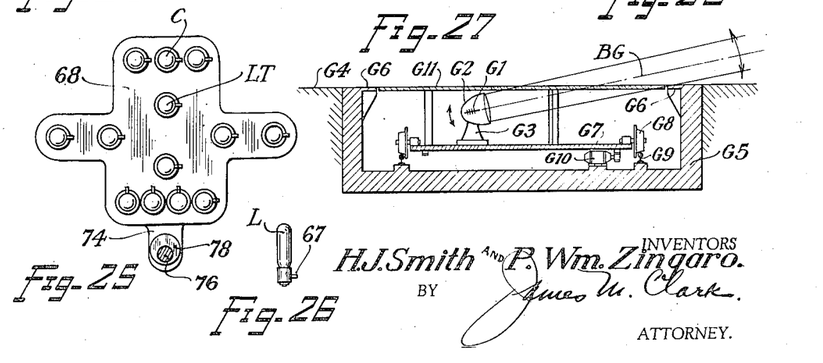
Fig. 25 is a detailed front elevation of the lamp assembly.
Fig. 26 is a detail of a lamp.
Fig. 27 shows a rotatable type glide beam projection flush with the airport surface.

In the latter Fig. 27 the beam source SG comprises the radiating filament G1 enclosed by a parabolic reflector G2 adjustably mounted upon its base G3. The beam source assembly is located entirely beneath the surface G4 of the airport within the walls of a pit G5 having an inwardly extending annular portion G6 flush top with the surface G4. The base G3 is mounted upon a rotatable turntable G7 having wheels G8 running upon a circular track G9, being driven by motor G10 and associated gearing, either automatically as by means of a wind vane, or by manual control. Suitable well known commutator rings and brushes (not shown) are provided to maintain power supply to the filament in its plurality of rotated positions and a circular flush cover G11 having a transparent portion G12 is supported from the turntable to protect the assembly and permit wheels of aircraft and other vehicles to run thereover without obstruction. It is evident therefore that the beam BG can be adjusted to any point in the compass into which the wind is blowing and adjusted to suit the gliding angle of the airplane, and accordingly define its desired gliding path as may be determined by the landing characteristics of the particular airplane, wind direction, runway location, local traffic or other conditions.

Figures 15, 16, 17, 18, 19, 20:
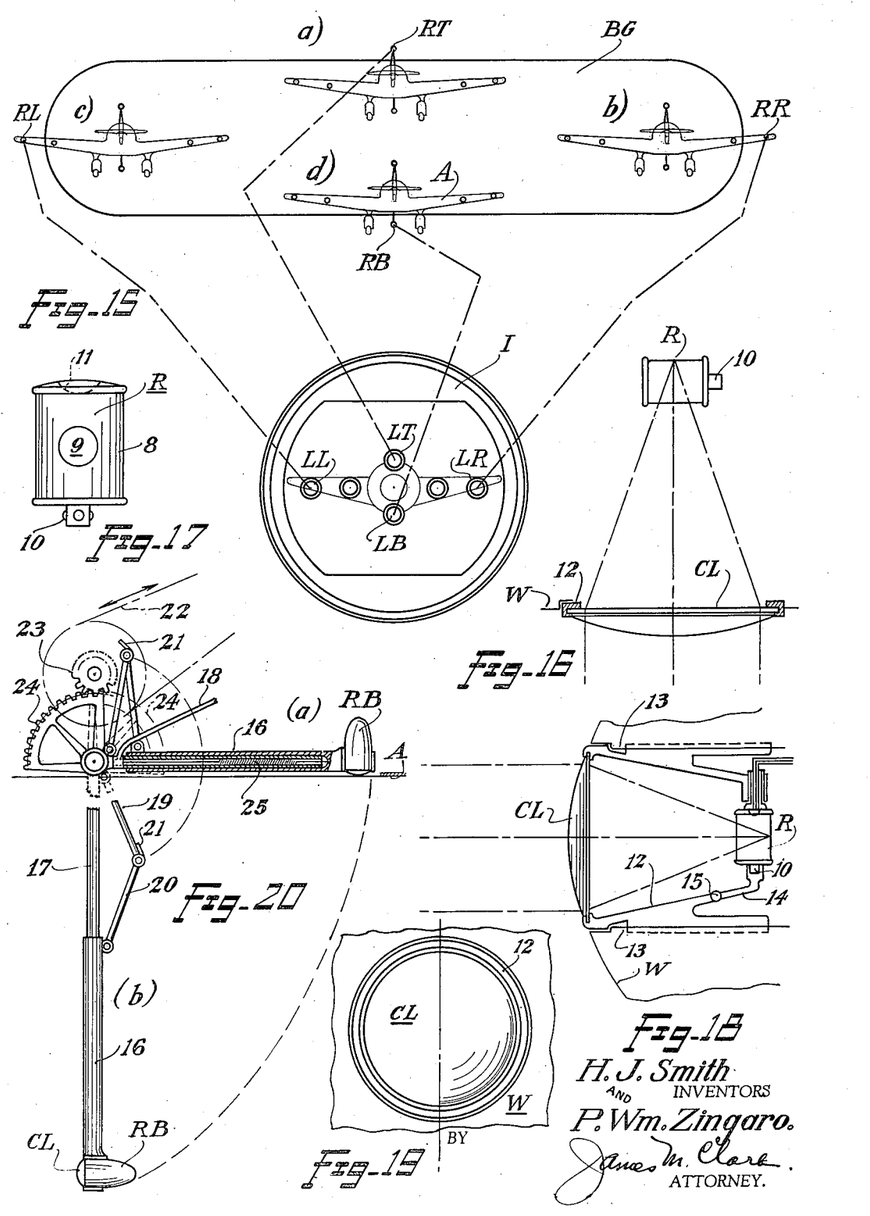
Fig. 15 shows a beam in cross-section with a plurality of flight positions and an instrument for indicating the same.
Fig. 16 shows an enlarged detail of a lower surface, flush type receptor.
Fig. 17 shows a view of the receptor element.
Fig. 18 shows a cross-sectional detail of a fixed leading edge receptor.
Fig. 19 shows a front elevation of the same.
Fig. 20 is a detailed cross-sectional elevation of an extensible receptor and retracting mechanism for the same.

The operation of the landing system shown in Figs. 3 and 4 is as follows: The airplane A being landed, say under blind flying conditions, readily enters the field of the glide beams BG at its cruising speed at a considerable distance from the beam source SG at which distance the cross-section of the field of activity is relatively large and easily picked up. Referring now to Fig. 15 the views of the four airplane positions are taken from the tail looking forward in the same direction as the pilot views the indicating instrument I. Assuming that the airplane in following the beam BG gets into the position (a) in Fig. 15 in which the upper receptor RT extends above the beam outline, then the corresponding lamp LT on the indicating instrument I will not be fully lighted. Since in this position the lamps LR, LL and LB will be burning brightly the pilot will become aware that part of the craft has emerged from the beam, and that he is flying above the center of the beam and should adjust his controls accordingly. Likewise in positions (b), (c) and (d) when lamps LR, LL and LB are dimmed respectively, he is aware that the airplane is flying too far to the right, left or below the core of the beam. These lamps, corresponding to the frontally directed receptors, are also similarly designated on the more complete indicating panel IP shown in Figs. 21 to 26 inclusive.

Figure 21:
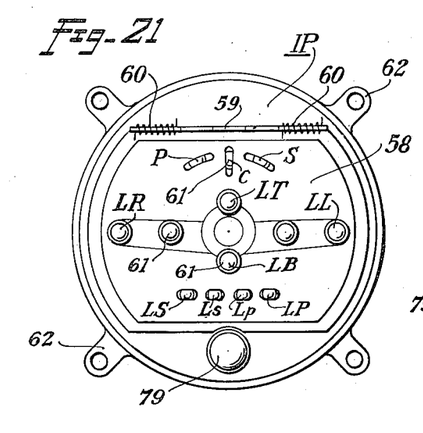
Fig. 21 shows a front elevation of an instrument for indicating vertical, horizontal and lateral deviations.

As the airplane A in Figs. 3 and 4 passes through the vertical beam B3, one or more of the four undersurface receptors RS, Rs, Rp and RP become energized causing the corresponding lamps LS, Ls, Lp and LP on the instrument IP in Fig. 21 to become fully lighted indicating to the pilot his altitude and distance from the airport. The beam B3 is preferably modulated, as by a suitable chopping means, to permit its being distinguished from the other vertical checking beams. A preferred signal for this system is a series of long impulses or dashes for beam B3, dash-dots for B4, and dots for B5, and in a modification green, yellow and red lamps respectively are used. After passing through the beam B5 the pilot starts to level off the airplane for its landing attitude at about the time all of the frontal receptors would be energized by the horizontal ground beam BH which preferably transmits dashes or frequent impulses of short duration. As the aircraft continues to level off and only the lamp LT flashes, and the vertically spaced detectors RR and RL are not energized, the pilot knows that he is flying parallel to the surface of the runway and substantially horizontal and that the airplane is passing above the converging rays of the glide beam BG. In this attitude the pilot knows within a foot or two the exact height of the airplane above the runway and from this point on he need only settle the airplane on the runway, despite extremely heavy fog or similar conditions which might prevent his seeing the runway even with the assistance of his conventional landing lights.

The vertical or intersecting beams B3, B4 and B5 have the additional function of assisting in locating the beam BG. In the event the airplane has not entered the directional beams BG because of improper altitude or direction, by climbing and circling it may readily pass through one of the vertical beams as indicated and identified by the undersurface lamps LS, Ls, Lp or LP from which the pilot can readily orientate himself by reducing his altitude and returning for another try at picking up the directional beam. To further assist in picking up a glide beam which the airplane might pass across and be swept laterally by, wing tip receptors are provided to pick up such beams and actuate corresponding indicating lamps. Such wing tip receptors are indicated by RWT in Figs. 11 and 12.

It should be noted that once the directional field is entered, the arrangement leaves to the pilot only the responsibility of guiding the airplane along the path indicated by the lamps on the instrument board constituting a constant visual check on the gliding angle and an intermittent check on the altitude and speed of the airplane. It should also be noted that the angle of the glide beam is readily adjustable for the characteristic landing angles of airplanes of different sizes and speeds. The term "glide path" as used herein is well understood, being the optimum angle at which altitude is reduced in direct line flight, consistent with good controllability, as distinguished from a circling path, and does not necessarily mean gliding only under "power off" conditions.

It is also to be noted that each of the beams of the landing system is controllable from the airport to suit the characteristics and conditions to be met with by the incoming airplane. It will be evident to one skilled in the art that the system shown in Figs. 3 and 4 can also be used for guiding aircraft in taking off from an airport which may otherwise be closed in due to poor visibility, or be surrounded by obstructions. In such instances the beam is preferably directed into the wind, or to clear such obstructions, and rearwardly exposed receptors are also provided to pick up the beam from behind. Such landing and take-off systems are particularly adapted for use by military aircraft since they can be fully utilized without the use of illumination, and its exposure thereby to enemy aircraft prevented.

Figure 5:
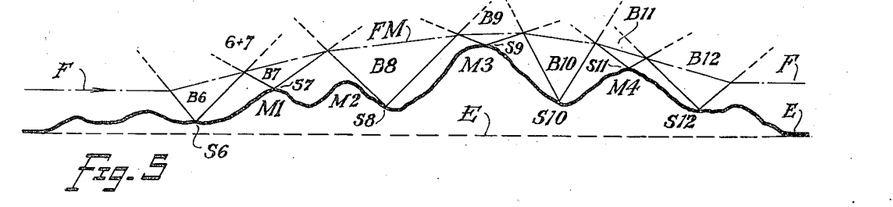
Fig. 5 is a side elevation of a vertical beam system for guiding aircraft over a mountain range.

Fig. 5 shows a beam system defining a safe altitude path FM across a range of mountains M which project above the normal altitude F flown by aircraft over the elevation of adjacent terrain indicated by the dash line E. The beam radiators S6 to S12 are arranged at successive points, either at the peaks or in the valleys, in the vertical plane of the course to be flown. They preferably project beams of the shape shown in Fig. 2 such that the margins of adjacent beams intersect in a straight line of relatively great width across the course of the aircraft and at an altitude defining the flight path to safely clear the adjoining peaks. The successive beams are operated at a fixed code known to, and recognized by the pilot, such as dot-dash for B6, dot-dot-dash for B7 and so forth. The beam may be coded or modulated either by rotating slotted discs or other well-known chopper or interrupter means.

The operation of the system in Fig. 5 is as follows: An airplane travelling the flight path F (from left to right) picks up impulses by its undersurface receptors in entering the beam B6 and climbs at a predetermined altitude to clear the next mountain M1, whose elevation may or may not be known to the pilot. Should he climb as too steep an angle he will pass through the zone 6+7 where the beams B6 and B7 overlap and which he will immediately recognize. In the event that he has not climbed steeply enough he will pass out of B6 before he enters B7 and his indicating lamps will dim, warning him that he will be required to climb more steeply in order to return to the safe altitude defined by the path FM. As he passes beyond the highest peak M3 into the field of beam B10 the pilot can reduce his altitude accordingly until he passes beyond the field of B12 and again resume unobstructed flight along the path F. Obviously the system is similarly utilized by aircraft flying in the opposite direction.

Figure 6:
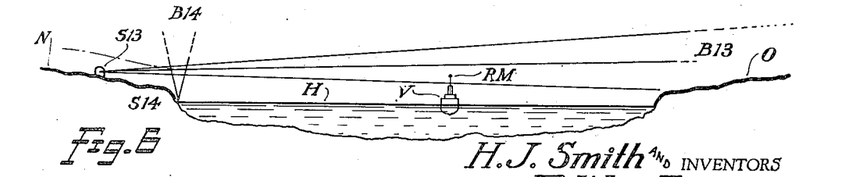
Fig. 6 is a side elevation of guiding systems for directing both marine craft and aircraft across a body of water.

Fig. 6 shows a guide beam system across a body of water adapted for aircraft or marine vessel use. A body of water H separates two points of land N and O; a horizontal beam B13 is projected from the radiator S13 on land N toward land O, and is intercepted by a vertical beam B14 projected from a source S14 located at the shore line. An airplane flying from right to left readily picks up the field over O by means of frontal receptors as previously described and when its undersurface receptors indicate passage over the shore line at B14 it climbs sufficiently, leaving the beam B13 for guidance by other shore navigating means. The beam B13 is also utilized by vessels V, preferably equipped with masthead receptors RM, for either obtaining a bearing as it crosses the beam or for steaming, as a ferry, from either short to the other.

Figure 7:
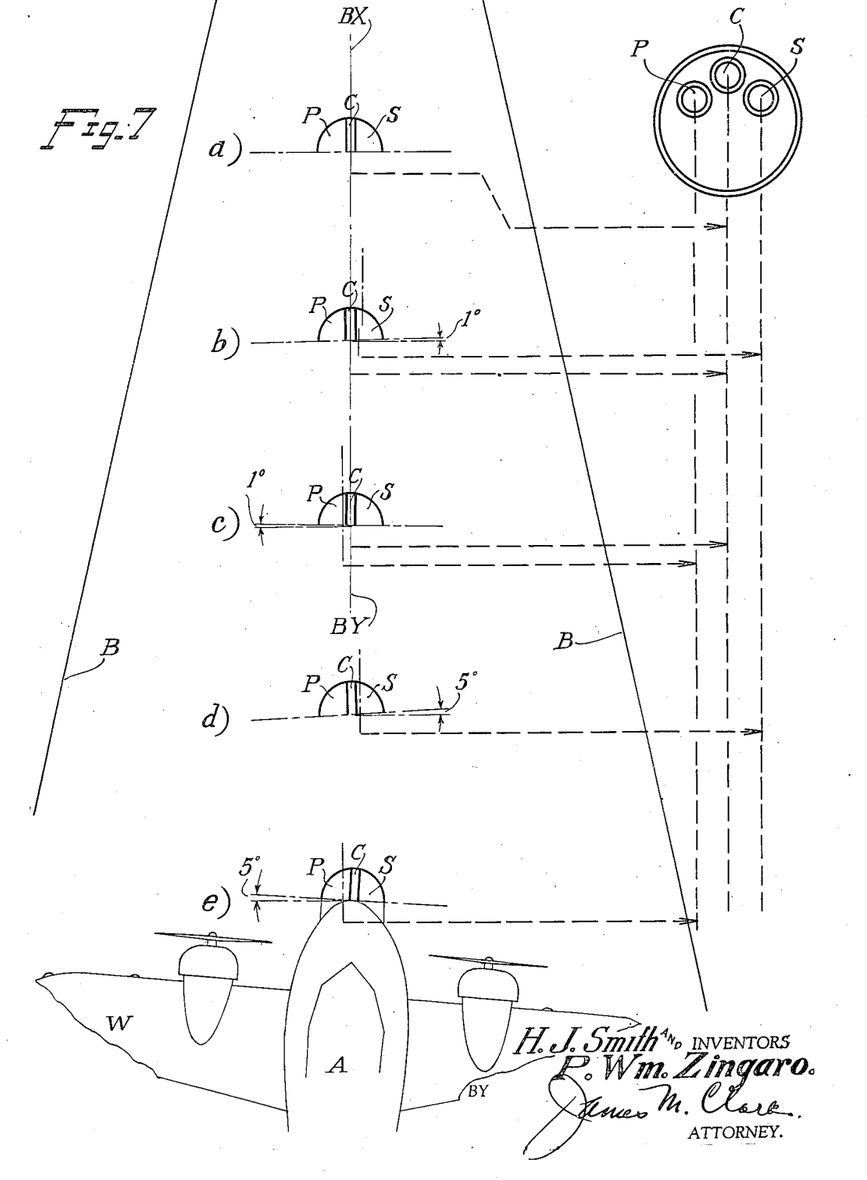
Fig. 7 shows in plan the method of indicating the various attitudes of an aircraft with respect to the axis of a guiding beam by means of a nose receptor.
Figure 8:
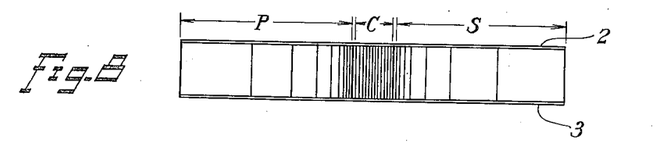
Fig. 8 shows a front elevation of a form of nose receptor.
Figure 9:
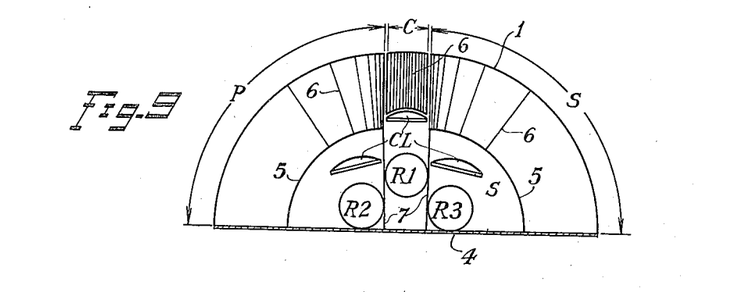
Fig. 9 shows a sectional plan of the same.

Fig. 7 shows the adaptation of a shuttered receptor to the nose portion of an airplane and the indicating instrument used therewith. Figs. 8 and 9 show respectively, a front elevation of the nose receptor and a sectional plan of the same. This device comprises a semi-circular box having a transparent front 1, with opaque metal top 2, bottom 3 and back 4. The box is divided into a central compartment C aligned with the longitudinal axis of the craft, and port and starboard compartments P and S respectively, each having housed therein receptors R1, R2 and R3. The entire device is preferably faired into the nose of the craft for reduction of resistance in flight. Between the front 1 and similar transparent inner sheets 5, radial vanes or shutters 6 are arranged to confine the rays in rectilinear paths to each sensitive receptor, and partitions 7 are interposed between each receptor to shield each from reflected rays intended for another. The vanes in the central portion are arranged to permit passage of rays diverging but very slightly from the central axis, say, up to and including 1 degree divergence either side of the central axis. The vanes in the outer compartments would transmit rays of, say, from 1 degree to greater divergencies either side of the central axis. Condensing lenses CL are preferably provided to provide greater concentration of the rays into each receptor. Concentric ring vanes arranged in a honeycomb fashion may be substituted for the parallel vanes 6 with equally effective results.

Referring now to Fig. 7, as the airplane A passes along the core of the beam B aligned with its central axis which is denoted by the line BX—BY, with zero degree divergence as at position a, rays will pass through the central portion only and lamp C on the indicator panel will light, while P and S are not actuated. At position b, as the craft veers to port 1 degree, lamps C and S are lighted indicating a slight divergence; at position c a similar divergence in the opposite direction lights lamps P and C; when, however, the craft veers 5 degrees to port and starboard, as in positions d and e, lamps S and P, respectively, are lighted, while C remains dimmed in each case, indicating divergencies in either case greater than 1 degree. These nose receptor lamps are also shown in the more complete indicating instrument of Fig. 21, as P, C and S over the other frontal lamps. By means of this arrangement the craft is accurately maintained on its true course along the beam axis.

Figure 10:
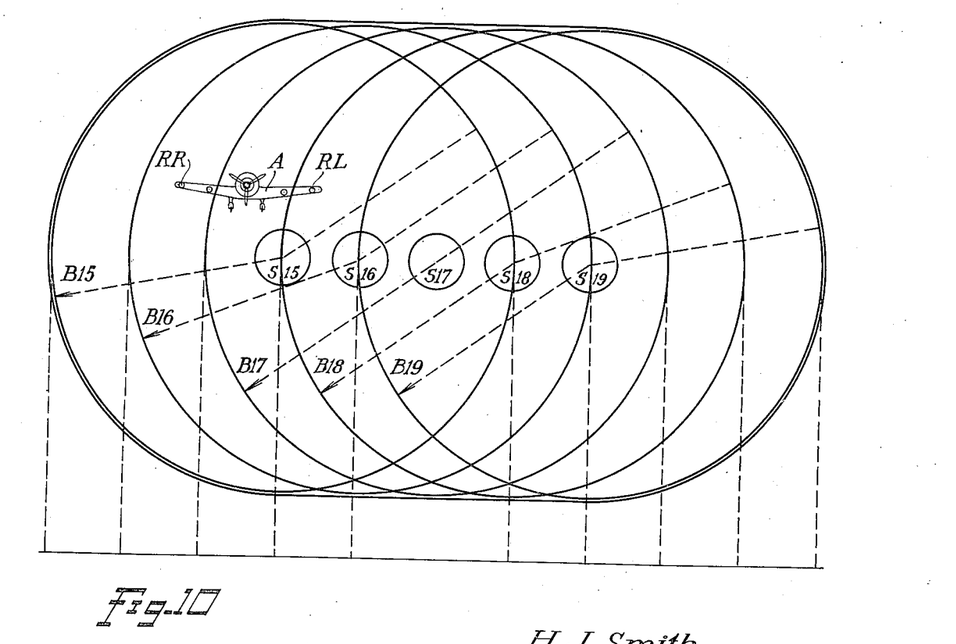
Fig. 10 shows a cross-section of a bundle of beams projected from a plurality of energy sources.

In Fig. 10 there is shown a composite beam projected from a plurality of spaced beam sources S15 to S19, whereby a strong beam is given greater width and a lentil-shaped core of relatively great intensity due to the overlappage of the several individual beams. The position of the airplane A within this composite beam can be determined by the different wave intensities picked up by its receptors as hereinafter more fully described in connection with the lateral deviation indicator of Fig. 13.

Referring now to Figs. 16 to 19 inclusive, Fig. 17 shows in detail one form of a photo-electric cell used with the present invention, in which the elements are contained in cylindrical shell 8, having a window 9, supporting base 10 and contact attachment recess 11. Fig. 18 shows its assembled relationship in a wing leading edge W into which its condensing lens CL is supported by the frame 12 releasably held by the detents 13. The receptor R is removably held within the frame by its finger portion 14 urged upwardly by the spring hinge 15. The lens CL is faired into the leading edge of the wing W, as also shown in the front elevation of Fig. 19, in a streamlined relationship and is preferably provided with means to prevent its being covered up during icing conditions. Fig. 16 shows the similar installation of an undersurface receptor in which the several parts are similarly designated.

Fig. 20 shows a form of the operating mechanism whereby the bottom receptor RB of Fig. 15 is projected from and retracted within the body of the airplane A. The receptor RB of streamline shape with lens CL is attached to the extremity of the cylinder 16 into which the tubular piston 17 is adapted to telescope as controlled by hydraulic pressure transmitted through the flexible tube 18 supplied from a suitable pump. Relative rotation of the piston and cylinder is prevented by the torque links 19 and 20, the latter being provided with a detent 21 which serves as a limit stop in the extended position (b). By means of tension on the chain 22, under control of the operator, in one direction of the arrows the pinion 23 causes counter-clockwise rotation of the gear segment 24 from its dotted position to the full line position in which the strut is retracted from position (b) to its position (a) in which it is fully housed within the confines of the body A. The telescoping of the strut portions is preferably assisted by a tension spring 25 positioned within the hollow piston aiding the atmospheric pressure in overcoming the weight and drag on the cylinder element, and suitable shielded conductor leads are provided to the receptor RB.

Figure 28:
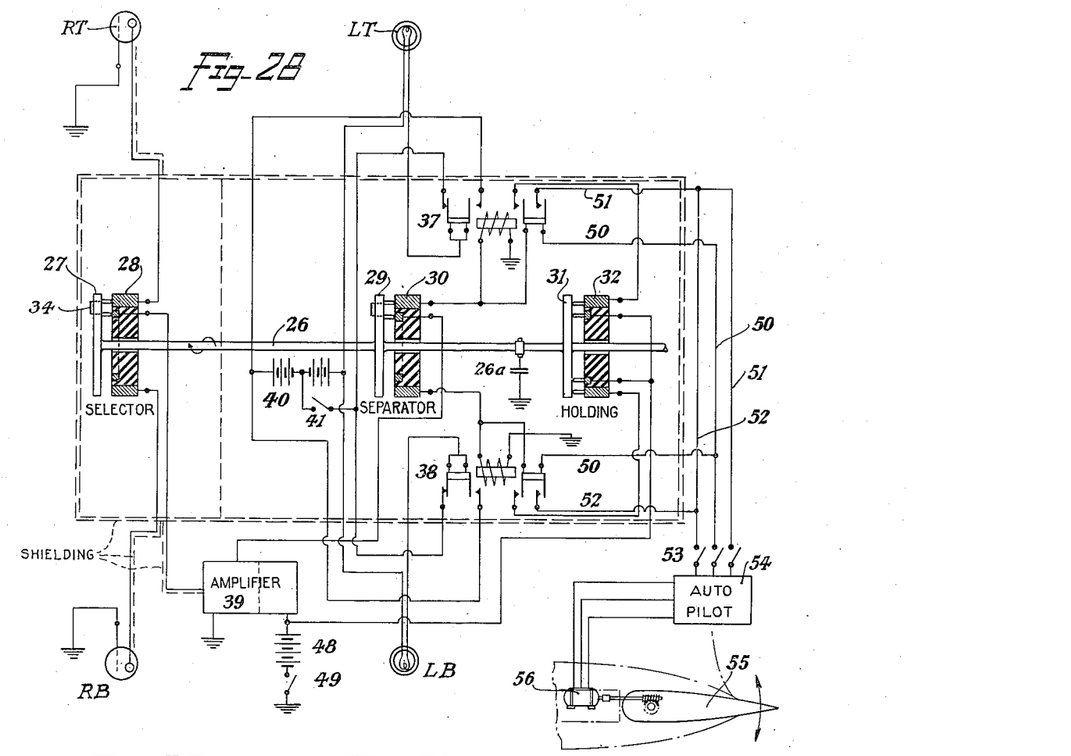
Fig. 28 is a wiring diagram of a system for selecting and amplifying the impulses to the receptors, and for distributing, lighting, and holding lighted, the respective indicating lamps.
Figure 29:
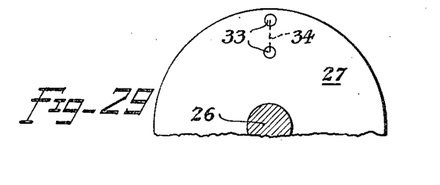
Fig. 29 is a fragmentary view of the selecting and separating rotors.

Referring now to Fig. 28, receptors such as RT and RB, as positioned on the aircraft as in Fig. 12, are adapted to actuate their respective indicating lamps LT and LB, as positioned on the indicating panel IP of Fig. 21. In the apparatus of Fig. 28, a grounded shaft 26 is rotatable at a predetermined constant speed and has fixed thereon rotor discs 27, 29 and 31 which engage fixed or stator discs 28, 30 and 32 respectively. Discs 27 and 29 are identical and are shown in detail in Fig. 29. They are each of non-conducting material 27 and are provided with two brushes 33 interconnected by a jumper wire 34, each of which are insulated by the disc material 27 from the shaft 26, which is grounded through the condenser 26a.

Figure 30:
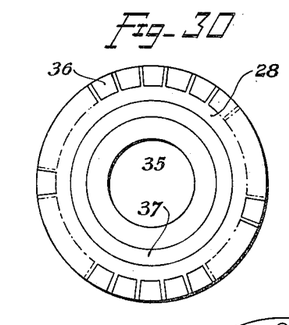
Fig. 30 is a view of the selecting and separating stators.

Stator discs 28 and 30 shown in detail in Fig. 30, are also identical and comprised of insulating material 28 having central openings somewhat larger in diameter than shaft 26 which rotates freely therewithin. In each disc 28 and 30 there is provided a series of segmental contacts 36 adapted to engage outer brush 33 of its respective rotor, and a contact ring insert 137 adapted to engage inner brush 33. Each segment 36 of selector stator 28 is connected to an element of its respective detector as RT or RB, the other elements of each receptor being grounded, as to the airplane structure. Each segment 36 of the separator stator 30 is connected to a relay controlling the respective lamp, as relay 37 for lamp LT, and relay 38 for lamp LB. The ring 137 of stator 28 leads to the input side of the common amplifier 39, the other input lead of which is grounded. The leads from selector 28 to each receptor and to the amplifier 39 are each well shielded.

Each relay 37 and 38 is of the four contact type in which one contact is made and the remaining three broken in the de-energized or normal condition of the solenoid. A common battery 40 having an intermediate, or half voltage contact, is wired to the filament of each lamp LT and LB such that when the switch 41 is closed the normally closed contact of each relay causes each lamp to burn dimly at half voltage, and the full voltage of the battery is impressed across each filament when the solenoids of the respective relay is energized, in which condition the filament burns brightly at its normal voltage.

Figure 31:
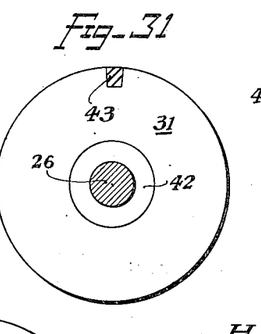
Fig. 31 shows the holding rotor.
Figure 32:
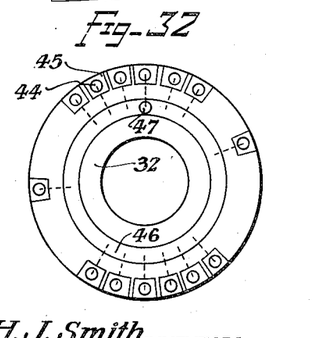
Fig. 32 shows the holding stator.

Holding rotor disc 31 is of conducting material, but is insulated from the shaft 26 by bushing 42, and is provided near its periphery with an insulated segment 42 somewhat narrower in width than the conductive segments 36. The insulated segment 43 is adapted to engage in running contact with the brushes 44 of the holding stator disc 32, the segments 45 of which are aligned with those of discs 28 and 30. The segment 43 is also aligned with the upper brushes 33 of rotors 27 and 29, and being narrower than segments 36 passes the brush 44 before the corresponding conductive segments 36 pass out of contact with their respective brushes 33. Stator disc 32 is also of non-conductive material and is provided with a conductor ring 46 and brush 47 adapted to engage in running contact the conducting body of rotor disc 31. The segments 36 of stator 30 are each connected to the solenoid coil of its respective relay and to the normally open double contact element of the latter. One lead of the amplifier output is in circuit with the collector ring 137 of the stator 30 and the other output lead runs to a battery 48 and thence to a ground through the disconnect switch 49. The last mentioned lead intermediate the amplifier and battery is also in circuit with the collector ring 46 of holding stator 32 thereby permitting the solenoid coil of each relay, a terminal of which is also grounded, to be held or remain energized by battery 48 for a succeeding revolution of shaft 26 after the relay has been once actuated by the amplifier output. The normally open contacts of each relay are connected in circuit with the leads 50, 51 and 52 through a control switch 53 to an automatic pilot 54 adapted to operate a control surface, such as an elevator 55e, as by a servomotor 56.

The operation of the apparatus of Figs. 28 to 32 inclusive, which is preferably called a distributor, is as follows. When the airplane assumes a position such as (a) of Fig. 15 in which receptor RT projects above, and the receptor RB remains within the beam BG, the receptor RB is energized and receptor RT is not. With the distributor in use, switches 41 and 49 are closed and the shaft 26 is rotating at a predetermined speed. With switch 41 closed, lamps LT and LB are burning dimly at half voltage, giving the pilot an opportunity to check all lamps and replace any which may be burnt out. In the top position of the rotor, as shown in Fig. 28, the receptor RT, which is not sensitized by the beam, although in circuit with the amplifier 39 through contacts at 36—33—137 on the selector discs 27 and 28, sends no current to the amplifier and, accordingly, no amplified currents are sent through the output leads thereof. It will also be noted that in the position shown the solenoid of relay 37 is put in circuit with the amplifier output by virtue of contacts 36—33—37 on the separator discs 29 and 30 but the solenoid is not energized due to lack of an amplified current. At this instant also the circuit from the battery 48 to the normally open pair of relay contacts is also opened by the insulated segment 43 engaging the segment 45, corresponding to lamp LT and relay 37 and the solenoid coil of the latter is accordingly not energized by battery 48. The said segments 43 and 45 are on discs 31 and 32, respectively, which control the relay holding circuit. It is therefore apparent that at this instant no current is caused to flow through either the selector, separator or holding circuits and lamp LT continues to burn dimly.

While but two receptors and lamps have been shown and will be described for the sake of clarity and simplicity in this explanation, it will be apparent that a large number of each can be accommodated by the distributor by merely connecting the remaining receptors, lamps and their respective relays to the corresponding segments 36 and 45 on discs 28, 30 and 32. Let it be assumed now that the rotating assembly has rotated through 180 degrees to the bottom segments 36 and 45 corresponding to receptor RB and lamp LB. Since RB is within the beam and is energized, a minute current passes through the selector circuit to the amplifier due to the jumper 34 on selector disc 27 interconnecting the bottom segment 36 with ring 137. Inasmuch as the separator circuit is similarly closed at the same instant by the correspondingly aligned contacts on discs 29 and 30, the amplified current is caused to flow through the solenoid coil of relay 38, the relay thereby being actuated and the filament of lamp LB is switched over from half to full voltage of battery 40 and the lamp burns brightly.

At this same instant the insulating segment 43 of disc 31 engages the lower brush 44 of segment 45 on disc 32 opening the holding circuit which has otherwise been closed by the actuation of relay 38. As the shaft 26 continues to rotate slightly beyond this point the insulating segment 43, being narrower than segment 36 on separator disc 30, passes beyond the brush 44, which then contacts the conductor disc 31, thereby closing the holding circuit before the separator circuit is broken and holding the relay in the operating position by virtue of its solenoid coil being energized by battery 48. The lamp LB is therefore kept burning brightly for substantially another rotative cycle of the shaft 26. During this condition of the relay 38 it will be noted that the circuit comprising the leads 50 and 52 is closed, and assuming that switch 53 is closed and the auto pilot 54 is in operation, the latter initiates operation of the servo motor causing a corrective movement of the elevator 55e to rotate downwardly and to thereby lower the nose of the airplane downwardly toward the center of the beam.

In the event the airplane is being flown manually the indication of the lamp LB burning brightly on instrument IP of Fig. 15, and LT being dim, would signify a similar movement of the respective control by the pilot to bring the airplane lower into the area of the beam. It is apparent from the latter figure that in position (d) the same lamps would show an opposite indication signifying that the airplane was being flown below the horizontal axis of the beam. Likewise in positions (b) and (c) lamps LR and LL, respectively, would burn dimly in each case, calling for corresponding corrective movements of the rudder 55r, either automatically or manually. For the purposes of this description, the airplanes in Fig. 15 are viewed from the tail looking forward in the same direction as the pilot would normally view the indicating instrument IP.

Referring now to Fig. 13, there is shown a lateral deviation indicator whereby the relative intensity of the rays at two spaced detectors is used to direct the pilot toward the core of the beam. The receptor RL is mounted within the left wing W, and has its leads 60 and 61 in circuit with the input of a sensitive photo-amplifier 62. In this amplifier the high impedance pentode 63 serves as a load impedance for the receptor RL which is preferably a vacuum type photo-tube, also of high impedance. In the circuit the potential of the common connection between RL and 63 may be determined by the intersection of the characteristics of each whereby a small change of intensity of radiated energy will result in an output of several volts. Such output voltage is applied to the grid of the output tube 64, the plate current of which is in circuit with one side of the movable element 65 of the differential indicator 66 through the leads 67 and 68. The voltage to the heater elements of 62 and 63 are reduced by the tapped lead 69 from the battery 70 in order to reduce the grid emission to a minimum due to the extremely high output impedance of the photo-tube RL with the load of pentode 63. The entire detector comprising the three tubes, three batteries, the potentiometer 71 and all interconnecting wiring is preferably shielded to prevent undesired absorption, or radiation, of energy.

Although not fully shown, it is obvious that the leads 72 and 73 are similarly wired to the detector-amplifier device which is in circuit with the oppositely disposed receptor RR. Assuming now that an airplane A is flying in a bundle of beams as shown in Fig. 10, receptor RL will receive a wave intensity approximately double that received by receptor RR, the former being within the area of four beams while the latter is only within the area of two. The voltage passing through 67—68 and the left side of the pivotally mounted movable element or armature 65 will therefore be substantially double that within 72—73 on the right side, with the result that the turning couple to the left as the element opposes the magnetic pole 74 will overcome that to the right and the pointer 75 will leave the zero position and move toward "L," indicating to the pilot that the core or center of the beam is toward his left. Similarly, an airplane moving along the edge of a beam as shown in position (b) of Fig. 15 would also show an indication of the beam center as being on the left. A similar indicating system is provided to indicate positions above or below the horizontal axis of the beam being actuated by the receptors RT and RB and having the pointer working over a vertical scale (not shown).

It is also contemplated to substitute an automatic pilot of any suitable known type for the differential indicator 66 whereby the rudder 55r is moved in the direction which brings the aircraft toward the core of the beam whereat the currents from each amplifier are substantially equal. In a similar manner vertically spaced detectors are caused to actuated the elevators 55e to raise or lower the airplane to the central core of the beam of equalized intensity.

In Figs. 14 and 14A are shown a ground speed metering device such as would be used with the beam system shown in Fig. 1. A stopwatch type speed meter 76 is provided with a stem 77 which when depressed a first time will initiate the clock mechanism which continues to run after the stem 77 is released but is stopped when it is depressed a second time. A pointer 78 is geared to the clock mechanism and works over a scale preferably graduated in miles per hour. A reset plunger 79 is provided to bring the pointer back to its starting position "ST." (shown in Fig. 14A) for a subsequent reading. The meter 76 is provided with a bracket 80 to which is pivoted a lever 81, in turn pivotally connected to a plunger 82 adapted to be actuated by the solenoid 83 and opposed by the tension spring 84. The solenoid 83 is in circuit with a battery 85 and a relay 86, the leads 87 and 88 of which are actuated by an undersurface receptor such as RS and would preferably be connected to its amplifier output. A condenser 89 across the relay contacts reduces arcing.

Accordingly, as an airplane A flying along the path F of Fig. 1 enters the field of beam B1 the undersurface receptor actuates the solenoid of the relay 85 closing the battery circuit through the solenoid 83, the downward movement of the plunger 82 causing similar movement of the stem 77 initiating the stop watch mechanism. As the airplane passes beyond B1 the plunger 82 is released, also releasing the stem 77, but the mechanism continues to operate and the needle 78 moves across the scale at a uniform rate. As the airplane enters beam B2 the undersurface receptor is again actuated and as the stem 77 is depressed a second time the pointer 78 will remain at that position, indicating the rate of speed at which the distance D was traversed. Obviously, the pointer as shown in Fig. 14A is in the start position and when actuated moves from right to left.

The details of the indicating instrument are shown in Figs. 21 to 26 inclusive. The indicating panel IP comprises a cylindrical casing 57, having a cover 58, pivotally mounted thereupon by the hinge 59 and urged toward its open position by the springs 60. The cover 58 is provided with a plurality of openings 61 disposed in alignment with a like number of lamps LT, etc., corresponding to the receptors RT, etc., positioned on the airplane. The casing 57 is provided with apertured mounting lugs 62 and screws 63 by which it is mounted upon an instrument panel 64. The lamps L, LT, etc., are mounted in bases 65, as by the bayonet type slots 66 engaged by the lugs 67, and are carried by a movable lamp assembly 68 having rearwardly extending studs 69 engaging tubular guides 70, the entire lamp assembly being continually urged forwardly by springs 71. The guides 70 are supported upon the rear wall of the casing 57, which is provided with a bossed opening 72 through which a harness 73 containing the lamp wiring enters.

The lamp mount 68 has a downwardly extending portion 74 which has a cylindrical opening 75 engaged by the shaft 76, being retained thereon by the collar 77 and the circular detent 78 which is eccentrically mounted upon the shaft. The front end of the shaft is provided with a knob 79 and the detent 80. A lug 81 at the bottom of the casing 57 serves to hold the lamp assembly 68 in its retracted position against the springs 70 through engagement by the offset portion of the detent 78. In the same, or operating, position of the lamps the cover 58 is held in the closed position by the detent 80.

Figure 22:
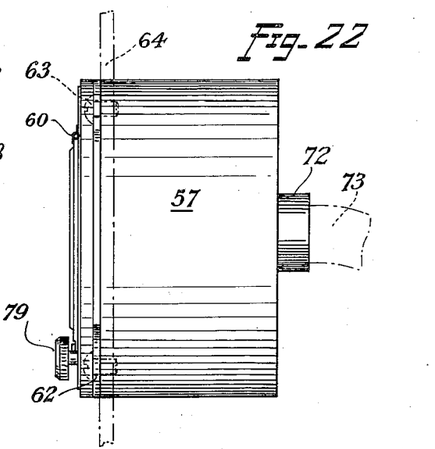
Fig. 22 is a side elevation of the exterior casing of the same.

During normal operation, as shown in Figs. 21 and 22 with the cover 58 closed, the energization of the respective receptors is indicated through the openings 61 of the cover by the lighting of the corresponding lamps. The upper row of lamps P, C and S indicate the angular deviation with respect to the axis of the beam as detected by the shuttered nose reflector; lamps LR, LT, LB and LL disposed on the front elevational profile of the airplane denotes the presence of the respective frontal receptor either within or outside of the beam; and the lower row of lamps LS, Ls, Lp and LP indicate the passage of the airplane across a vertical or marker beam. Inasmuch as each of the lamps will normally burn dimly, the presence of a burnt out lamp is readily observed by the operator.

Figure 23:
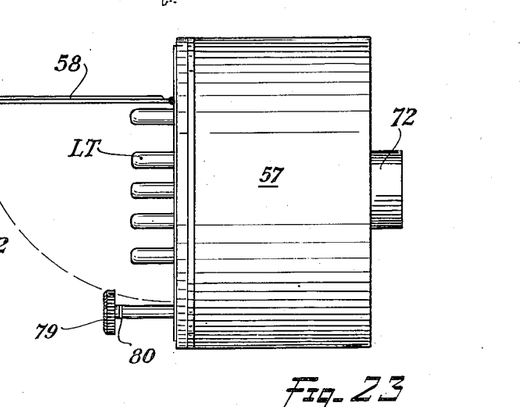
Fig. 23 shows a side elevation of the indicating instrument with the cover open and the lamp assembly in the extended position.
Figure 24:
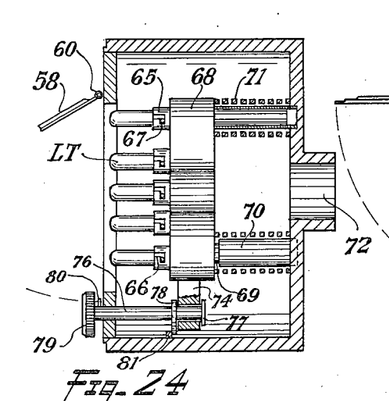
Fig. 24 shows a cross-sectional elevation of the same with the lamp assembly retracted.

The indicating panel is arranged such that defective lamps are quickly removed and replaced by the operator by using one hand only, while his other hand, for example could be kept on the control stick or reserved for other duties. Upon noticing a defective lamp the knob 79 is given a half turn in either direction, whereupon the cover 58 automatically springs open and the lamp assembly 68 moves to its forwardly extended position. After the defective lamp has been replaced the cover may be closed by the middle and ring fingers and the knob depressed and given a half turn by the thumb and index finger, whereupon the cover and lamp assembly are again locked in the closed position by the elements 80, and 78 and 81 respectively. It should be noted also that during this entire replacement operation the remaining lamps function uninterrupted and may be observed by the operator at all times.

It is to be understood that the above-described means have been selected as a preferred embodiment by way of explaining methods and apparatus for detecting, arranging, indicating and utilizing beams of radiant energy. The beams are preferably radiated at frequencies which are prime to and are not factors of standard radio, and commercial lighting and power frequencies whereby interference from these basic frequencies or their multiples or harmonics is entirely eliminated. Obviously, various adaptations and modifications may be made without departing from the spirit of the present invention, which although described in connection with aircraft is not limited thereto but may be utilized for the guiding of any object to which it is adaptable.

We claim:

1. A position indicating system for aircraft including an aircraft adapted for flight into a beam of radiant energy, a plurality of detectors disposed on said aircraft and adapted to be energized by exposure to said beam, an indicating panel provided with a like number of lamps corresponding to said detectors and distributing means adapted to successively select and amplify the energizations of the respective detectors, separate the amplified currents and hold lighted the respective indicating lamps corresponding to the detectors within the field of said beam, the said distributing means comprising a rotating assembly composed of a selector, separator and holding rotors having segments adapted to engage corresponding stators whereby each detector is successively placed in circuit with an amplifier, a plurality of relays having their solenoids in circuit with the respective segments of said separator rotor such that the corresponding amplified current energizes a relay causing the corresponding lamp to be placed in circuit with the full potential of an energy source and the relay held in such closed position by a circuit closed by said holding rotor for the remainder of the rotative cycle of the said rotating assembly until the first said energized detector is de-energized by emergence from the field of the said beam.

2. In a position determining system for aircraft including a plurality of detectors carried upon said aircraft into a directional beam of radiant energy projected from the ground, an indicating panel including lamps corresponding to said detectors, rotatable distributing means including relays adapted to successively select and amplify the energizations of the respective detectors, rotatable means for separating the amplified currents, means for holding lighted the same panel lamps energized by said beam, the said distributing means including a rotating assembly comprising rotors corresponding to said selector, separator and holding circuits, said rotors engaging corresponding stators whereby each detector is successively placed in circuit with a source of potential, said holding stator adapted to maintain said respective relay in closed position for the remainder of the rotative cycle until the first said detector is de-energized by emergence from the field of said directional beam.

3. A position determining system as set forth in claim 2 characterized by the inclusion of a tapped source of electrical energy and electrical means in circuit with said source, separator means and relays whereby said lamps are normally lighted dimly at part potential and for checking by an operator and upon energization of the corresponding detector at full potential.

4. The combination with a position indicating system for aircraft comprising an aircraft adapted for flight within a directional beam of radiant energy, a plurality of detectors operatively carried upon said aircraft and adapted to be energized by exposure to said beam, a source of electrical energy, and an indicating panel provided with a like number of lamps corresponding to said detectors, mechanical and electrical distributing means in circuit with said source of electrical energy adapted to successively select and amplify the energizations of the respective detectors, separate the amplified currents and light the respective indicating lamps from said source of electrical energy corresponding to the detectors within the field of said beam and holding means in circuit with a second source of electrical energy actuated by said first means to maintain the respective lamps lighted for a predetermined period after the respective detectors have been de-energized by emergence from said beam.

5. The combination in a position indicating system for aircraft adapted for flight into a directional beam of radiant energy including a plurality of detectors carried upon said aircraft adapted to be energized by exposure to said beam, an indicating panel provided with a like number of lamps corresponding to and in circuit with said respective detectors, rotatable electrical-mechanical distributing means adapted to successively select and amplify the energizations of said respective detectors, separate the amplified currents and light the respective indicating lamps corresponding to the said detectors within the said beam and holding means actuated by said distributing means adapted to hold said lamps lighted for substantially one rotative cycle after its respective detector has been de-energized by emergence from said beam.

6. In a position determining system for a dirigible vehicle including a plurality of detectors carried upon said vehicle into a directional beam of radiant energy, a source of electrical energy carried by said vehicle, a plurality of indicators adapted to be placed in circuit with said energy source and said respective detectors, a plurality of relays corresponding to said indicators having their solenoids energized by said energy source, rotatable distributing means adapted to successively select and separate the energizations of the respective detectors, means for holding energized the solenoids of said relays for maintaining in circuit the respective indicators, the said distributing means including contacting pairs of rotating and fixed rotors and stators corresponding to said selector, separator and holding circuits whereby a given detector energized by said beam is placed in circuit by said rotatable selecting and separating means for the actuation of its corresponding indicator and the relay for said indicator maintained energized by said holding means for the remainder of the rotative cycle until said detector is de-energized by emergence from the field of said directional beam.

7. A position determining system as set forth in claim 6 characterized by the inclusion with said vehicle of a plurality of control instrumentalities adapted for directing said vehicle into said directional beam, a plurality of servo motors for the operation of said respective control instrumentalities and means actuated by the respective energized relays for the automatic control movements of said servo motors and said control instrumentalities.

HARRY J. SMITH.
P. WILLIAM ZINGARO.